United States Patent [19]

Wakisaka

[11] Patent Number: 4,666,156

[45] Date of Patent: May 19, 1987

[54] METHOD OF PRODUCING A GOLFING AID

[75] Inventor: Yoshiki Wakisaka, Tokyo, Japan

[73] Assignees: Kabushiki Kaisha Nice Shot, Tokyo; Kabushiki Kaisha Cyuou Kousoku Consultant, Osaka, both of Japan

[21] Appl. No.: 715,984

[22] Filed: Mar. 26, 1985

[30] Foreign Application Priority Data

Aug. 6, 1984 [JP] Japan ................................ 34-120274

[51] Int. Cl.⁴ ............................................. A63B 67/02
[52] U.S. Cl. ................................... 273/32 H; 434/152
[58] Field of Search ................... 273/32 R, 32 H, 409; 283/1 A, 1 R; 434/85, 90, 92, 150, 151, 152, 153

[56] References Cited

U.S. PATENT DOCUMENTS

| 2,189,592 | 2/1940 | Perera | 434/152 |
| 2,309,627 | 2/1943 | Cook et al. | 434/152 |
| 3,928,925 | 12/1975 | Gay, Jr. | 434/152 |
| 4,148,580 | 4/1979 | Hill, Sr. | 434/152 |
| 4,505,478 | 3/1985 | Biethmiller | 273/32 H |

FOREIGN PATENT DOCUMENTS 2127701 of 1984 United Kingdom ................ 273/409

OTHER PUBLICATIONS

Engineering Drawing: 6th Edition, by Thomas E. French, 1941, p. 517.

Primary Examiner—Richard C. Pinkham
Assistant Examiner—T. Brown
Attorney, Agent, or Firm—Huff & Hanson

[57] ABSTRACT

There is disclosed a method of producing a golfing aid, which method comprises the steps of:

providing an aerial photograph of a first hole of a golf course;

translating the aerial photograph into a topographical map (2) of the first hole of the golf course and a vertically sectional view (3) of the first hole of the golf course; and printing a representation of the topographical map and the vertically sectional view onto the surface of the same or different sheet members (1). The golfing aid produced thereby enables a player to accurately grasp the configuration of a course at which he plays golf for the first time and, therefore, make appropriate shots.

7 Claims, 2 Drawing Figures

FIG. 2

| H O L E | YARDS | | P A R | | | | | H D C P | H O L E | YARDS | | P A R | | | | | H D C P |
|---|---|---|---|---|---|---|---|---|---|---|---|---|---|---|---|---|---|
| | BACK TEE | FRONT TEE | | | | | | | | BACK TEE | FRONT TEE | | | | | | |
| 1 | 501 | 484 | 5 | | | | | 3 | 10 | 447 | 423 | 4 | | | | | 6 |
| 2 | 357 | 339 | 4 | | | | | 9 | 11 | 397 | 369 | 4 | | | | | 14 |
| 3 | 376 | 350 | 4 | | | | | 15 | 12 | 138 | 115 | 3 | | | | | 18 |
| 4 | 192 | 178 | 3 | | | | | 13 | 13 | 365 | 345 | 4 | | | | | 16 |
| 5 | 382 | 360 | 4 | | | | | 1 | 14 | 391 | 374 | 4 | | | | | 4 |
| 6 | 387 | 369 | 4 | | | | | 7 | 15 | 188 | 169 | 3 | | | | | 10 |
| 7 | 362 | 346 | 4 | | | | | 17 | 16 | 539 | 521 | 5 | | | | | 2 |
| 8 | 159 | 140 | 3 | | | | | 11 | 17 | 430 | 408 | 4 | | | | | 8 |
| 9 | 502 | 480 | 5 | | | | | 5 | 18 | 495 | 472 | 5 | | | | | 12 |
| OUT | 3,218 | 3,046 | 36 | | | | | | IN | 3,390 | 3,196 | 36 | | | | | |
| | | | | | | | | | OUT | 3,218 | 3,046 | 36 | | | | | |
| ATTESTED | | | | | | | | | TOTAL | 6,608 | 6,242 | 72 | | | | | |
| PLAYER'S SIGNATURE | | | | | | | | | HANDICAP | | | | | | | | |
| | | | | | | | | | NET SCORE | | | | | | | | |

•DATE  •COMPETITION  •PLAYER

METHOD OF PRODUCING A GOLFING AID

BACKGROUND OF THE INVENTION (1) Field of the Invention

The present invention relates to a method of producing a golfing aid and to a golfing aid which comprises guide maps for a golf course, by which a person can accurately grasp the configuration of a course at which he plays golf for the first time and, thereby, appropriately make judgments of the shots he should play.

(2) Description of the Prior Art

At a course where a person plays golf for the first time, that person often cannot gain a good score because he does not know the state of the "ups" and "downs" of the course or because there is a pond or a bunker of which he is not aware and which is out of sight.

In view of the above, it is known for golf courses to be shown by illustration; however, the illustration merely shows the three-dimensional course in a planar fashion. Thus, by referring to this illustration, the slanting state of the course cannot be determined, the location and the size of natural features on the earth, such as woods, cannot be accurately grasped, and the distance is not correctly shown.

SUMMARY OF THE INVENTION

An object of the present invention is to provide a golfing aid by which the slanting state of the course and the distance up to a up hole can be accurately grapsed, whereby a person can appropriately make shots even at a course where he is playing for the first time.

It is another object of the present invention to provide a golfing aid by which the configuration of natural features on the earth, such as woods, ponds and the like, can be accurately grasped.

It is still another object of the present invention to provide a golfing aid by which how to approach each hole of the course can be studied in advance and which can be used as data for review after playing.

According to the present invention, there is provided a method of producing a golfing aid, which method comprises the steps of:
  providing an aerial photograph of a first hole of a golf course;
  translating the aerial photograph into a topographical map of the first hole of the golf course and a vertically sectional view of the first hole of the golf course; and
  printing a representation of the topographical map and the vertically sectional view onto the surface of the same or different sheet members.

These and other objects, features, and advantages of the present invention will be well appreciated upon consideration of the following description of the invention when taken in conjunction with the attached drawings with understanding that some modifications, variations and changes could be easily done by the skilled in the art to which the invention pertains without departing from the spirit of the invention nor the scope of the claims appended hereto.

BRIEF DESCRIPTION OF THE DRAWINGS

FIG. 2 is a plan view showing an example of a score table to be put on the golfing aid according to the present invention.

DETAILED DESCRIPTION OF THE INVENTION

Figure 1:
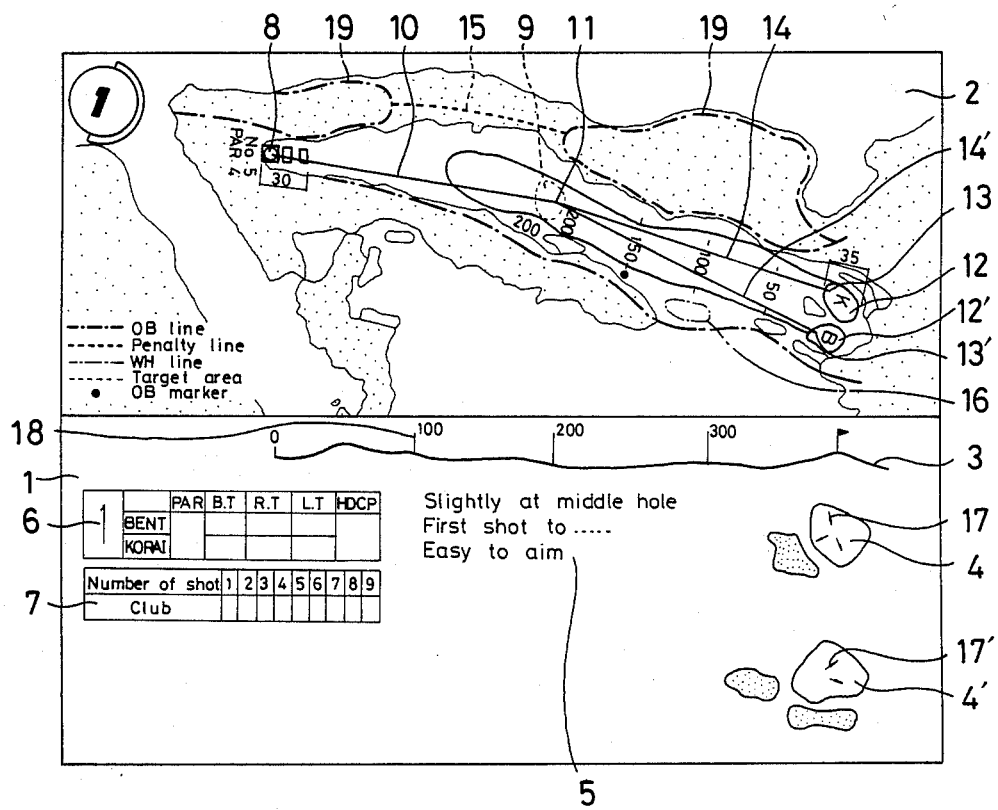
FIG. 1 is a plan view of a golfing aid, according to the present invention, for a hole of a golf course.

The golfing aid produced thereby comprises a topographical map of the course based on an air photograph thereof and a vertically sectional view of the course printed on the surface of one or more sheet members. A guide line connects together the standard positions of a shot ball from a tee, as starting position, up to a cup hole, and a scale indicates the distance from the tee to the cup hole may also be printed on the topographical map. Topographical and vertically sectional views of each hole of the golf course may be combined together, whereby the natural features on the earth, the slanting state and the distance up to the cup hole for all the holes can be approximately accurately known.

Preferably, in the method of the present invention, the or each sheet member in respect of the first hole of the golf course is combined with a sheet member or members, prepared by the steps of the present invention, relating to further holes of the same golf course to form a set of guide maps relating to at least part of the golf course.

Conveniently, the or each sheet member in respect of each hole of the golf course are combined to form a set of guide maps.

The method of the present invention may comprise the following further steps:
  printing, on the topographical map, guide lines which represent standard shots for the hole of the golf course to which the topographical map relates;
  printing a scale on the or each topographical map, the scale indicating distances to the cup hole of the respective hole of the golf course;
  printing on the or each topographical map: an out-of-bounds (OB line), a penalty line and a water hazard (WH) line;
  printing on one of the sheet members relating to a hole of a golf course or on a further sheet member, a map representing the green of that hole of the golf course, wherein the slope of the green is shown on the printed green by an arrow.

In the golfing aid, a target area and an OB (out-of-bounds) marker should be shown on the topographical map to be easily discernible.

Reference will now be made, by way of example only, to the accompanying drawings, in which:

FIG. 1 is a plan view of a golfing aid for a golf course, and shows an example in which a topographical map 2 based on an air photograph is printed over more than an upper half portion of the surface 1 of a sheet member, the vertically sectional view 3 of the topographical map 2 is printed below this topographical map, and greens 4,4', a column 5 indicating a course-attacking way, and a column 6 indicating the distance from a tee ground to a cup hole and a column 7 indicating clubs used are printed at the lower right portion, the lower middle portion, and the lower left portion of the paper respectively.

In the present invention, the topographical map of the course is required to be made based on the air photograph thereof, particularly, based on the air photograph in the vertical direction. By so doing, the slanting state of the course, the state of the natural features on the earth, such as woods, and the distances can be accurately known for the first time.

On the topographical map 2 are printed a guide line 10 connecting the tee area 8 with a target area 9 and guide lines 14,14' connecting the tip 11 of the guide line 10 and the cup holes 13 and 13' in greens 12 and 12' respectively. The illustrated embodiment shows an example in which a golf ball is shot on the green at the second shot, and therefore, only the standard position 11 of the first shot is shown therein. However, in case that the ball is put onto the green at the third shot, lines are printed to show the standard positions of the first and second shots.

The distances are indicated between the tee area 8 and the target area 9 and between the target area 9 and the cup holes 13 and 13'. In particular, the reason why the calibration of the distance indication is finely made in the latter case is that it enables a player to accurately grasp the distance from the target area to the cup hole to make an appropriate shot to the cup hole.

Further, an OB (out of bounds) line 19, a penalty line 15 and a WH (water hazard) line 16 are printed on the topographical map 2. These lines are preferably printed in a gay colour. But, some courses may not have such lines, in which case, no such lines are printed.

The vertically sectional view 3 of the course is printed below the topographical map 2 together with the distance-indicating scale 18. The slanting state of the course can be accurately known with reference to the vertically sectional view 3. If the ball stops on the down slope of the course, as well known, it is difficult to make the next shot. However, by accurately grasping the slanting state of the course, it is possible to make a wiser shot to prevent the ball stopping on the down slope.

Arrows 17 and 17' indicating the slanting state of the greens are printed on the greens 4 and 4' at the lower right portion of the surface of the sheet member. Although to know the slanting state of the green is particularly important in putting, these arrows are not always necessary because the slanting state can be known when the player stands there.

Explanation on the features of the course, the attacking way and the like are printed on the course-attacking way indicating column 5 positioned at the lower central portion of the surface of the sheet member 1, but this column is not essential.

The distances which are inherently dependent upon the course are printed on the column 6 indicating the distance from the tee area to the cup hole, which is put on the lower left portion of the surface of the sheet member 1. In addition, the number of the course and the par are to be printed on this distance-indicating column, the HDCP (handicap) may also be written on this column. The terms "Bent" and "Korai" refer to the type of grass of which the green is composed. "B.T." means back tee; "R.T." means regular tee; and "L.T." means ladies tee. This distance-indicating column is not always necessary for the present invention.

The used club-filling column 7 positioned at the lower left portion of the paper surface 1 is designed for writing the number of the clubs used at each shot, and is useful because the kinds of the clubs used can be reviewed after playing. This used club-filling column is not always necessary.

In putting the guide map for the golf course according to the present invention into market, such a guide map as shown in FIG. 1 may be prepared for each of all eighteen holes of a golf course and preferable a score table as shown in FIG. 2 is printed on the last sheet, and a cover may be attached to make a book-like shape which is easy to carry. In this case, it is preferably that each sheet member 1 is made of a paper of a synthetic resin, while the cover may be covered with a film of a synthetic resin such as polypropylene. By doing so, since the guide map can be carried together with the score table, use thereof is very convenient.

As mentioned above, according to the present invention, since the course can be accurately known and the guide map is easy to carry, a player can make appropriate shots even at a course where he plays golf for the first time, and can study in advance how to attack the course, and the guide map can be used as data for review after playing. Thus, the invention can contribute to the improvement of the golf technique to a large extent.

It is claimed:

1. A method of producing a golfing aid, which method comprises the steps of
   providing an aerial photograph of a first hole of a golf course;
   translating the aerial photograph into a topographical map of the first hole of the golf course and a vertically sectional view of the first hole of the golf course; and
   printing a representation of the topographical map and the vertically section view with a distance indicating scale on a sheet member, the representation of the map and the representation of the sectional view being adjacently opposed and the distance scale being interposed between the representation of the map and the representation of the sectional view.

2. A method according to claim 1, wherein the sheet member for the first hole of the golf course is combined with another sheet member, prepared by the steps of a method according to claim 1, relating to other holes of the same golf course to form a set of guide maps relating to at least part of the golf course.

3. A method according to claim 2, wherein the sheet member in respect of each hole of the golf course are combined to form a set of guide maps.

4. A method according to claim 1, further comprising the step of printing, on the topographical map, guide lines which represent standard shots for the hole of the golf course to which the topographical map relates.

5. A method according to claim 1, further comprising the step of printing a scale on the topographical map, the scale indicating distances to the cup hole of the respective hole of the golf course.

6. A method according to claim 1, further comprising printing, on the topographical map: an out-of-bounds (OB) line, a penalty line and water hazard (WH) line.

7. A method according to claim 1, further comprising printing, on the sheet members relating to a hole of a golf course, a map representing the green of that hole of the golf course, wherein the slope of the green is shown on the printed green by an arrow.

* * * * *